(12) United States Patent
Mukherjee et al.

(10) Patent No.: US 9,779,028 B1
(45) Date of Patent: Oct. 3, 2017

(54) MANAGING TRANSLATION INVALIDATION

(71) Applicant: Cavium, Inc., San Jose, CA (US)

(72) Inventors: Shubhendu Sekhar Mukherjee, Southborough, MA (US); Mike Bertone, Marlborough, MA (US)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 15/088,302

(22) Filed: Apr. 1, 2016

(51) Int. Cl.
*G06F 12/06* (2006.01)
*G06F 12/1045* (2016.01)
*G06F 12/1027* (2016.01)
*G06F 12/1036* (2016.01)
*G06F 12/1009* (2016.01)

(52) U.S. Cl.
CPC ...... *G06F 12/1063* (2013.01); *G06F 12/1027* (2013.01); *G06F 12/1009* (2013.01); *G06F 12/1036* (2013.01); *G06F 2212/152* (2013.01); *G06F 2212/452* (2013.01); *G06F 2212/651* (2013.01); *G06F 2212/683* (2013.01)

(58) Field of Classification Search
CPC ............ G06F 12/1009; G06F 12/1036; G06F 12/1027
USPC ................................................. 711/206–207
See application file for complete search history.

(56) References Cited

U.S. PATENT DOCUMENTS

| 5,437,017 A | 7/1995 | Moore et al. |
| 5,644,742 A | 7/1997 | Shen |
| 5,906,001 A | 5/1999 | Wu et al. |
| 5,909,698 A | 6/1999 | Arimilli et al. |
| 6,119,204 A | 9/2000 | Chang |
| 6,182,165 B1 | 1/2001 | Spilo |
| 6,199,154 B1 | 3/2001 | Witt |
| 6,272,604 B1 | 8/2001 | Nunez et al. |
| 7,073,043 B2 | 7/2006 | Arimilli et al. |

(Continued)

FOREIGN PATENT DOCUMENTS

EP 0592121 A1 4/1994

OTHER PUBLICATIONS

"CPU Cache Flushing Fallacy", Mechanical Sympathy, Feb. 14, 2013.

(Continued)

*Primary Examiner* — Than Nguyen
(74) *Attorney, Agent, or Firm* — Occhuiti & Rohlicek LLP

(57) ABSTRACT

Managing translation invalidation includes: in response to determining that a first invalidation message (IM) applies to a subset of virtual addresses (VAs) consisting of fewer than all VAs associated with a first set of translation context (TC) values, searching VA-indexed structure(s) to find and invalidate any entries that correspond to a VA in the subset; in response to determining that a second IM applies to all VAs associated with a second set of TC values and that no entry exists in invalidation-tracking structure(s) corresponding to the second set, bypassing searching any VA-indexed structure(s); and in response to determining that a third IM applies to all VAs associated with a third set of TC values and that at least one entry exists in the invalidation-tracking structure(s) corresponding to the third set, storing invalidation information in the invalidation-tracking structure(s) to invalidate the third set and delaying searching any VA-indexed structure(s).

20 Claims, 4 Drawing Sheets

(56) References Cited

U.S. PATENT DOCUMENTS

| | | | |
|---|---|---|---|
| 7,600,080 | B1 | 10/2009 | Bhattacharyya et al. |
| 7,600,217 | B2 | 10/2009 | Dostert et al. |
| 7,617,378 | B2 | 11/2009 | Arimilli et al. |
| 7,853,754 | B1 | 12/2010 | Agarwal et al. |
| 7,865,670 | B2 | 1/2011 | Cota-Robles et al. |
| 8,015,388 | B1* | 9/2011 | Rihan ............... G06F 12/1045 711/203 |
| 8,190,960 | B1 | 5/2012 | Bahadur et al. |
| 8,392,661 | B1 | 3/2013 | Metcalf |
| 8,769,036 | B2 | 7/2014 | Frey et al. |
| 8,832,381 | B2 | 9/2014 | Hunt |
| 2003/0229741 | A1 | 12/2003 | Stuber et al. |
| 2004/0215897 | A1 | 10/2004 | Arimilli et al. |
| 2004/0215898 | A1 | 10/2004 | Arimilli et al. |
| 2006/0010299 | A1 | 1/2006 | Zhang et al. |
| 2007/0070074 | A1 | 3/2007 | Jiang et al. |
| 2007/0180156 | A1 | 8/2007 | Irish et al. |
| 2011/0016289 | A1 | 1/2011 | Ableidinger |
| 2012/0117301 | A1 | 5/2012 | Wingard |
| 2013/0151782 | A1 | 6/2013 | Liu |
| 2014/0006689 | A1* | 1/2014 | Hashimoto ......... G06F 12/0246 711/103 |
| 2014/0112339 | A1 | 4/2014 | Safranek |
| 2014/0115268 | A1 | 4/2014 | Beers et al. |
| 2014/0164732 | A1 | 6/2014 | Muff et al. |
| 2014/0189285 | A1* | 7/2014 | Conrad ............... G06F 12/1027 711/207 |
| 2015/0006805 | A1 | 1/2015 | Feekes et al. |
| 2015/0032971 | A1* | 1/2015 | Tian .................... G06F 12/0842 711/141 |
| 2015/0089150 | A1* | 3/2015 | Kessler ............... G06F 12/1045 711/139 |
| 2015/0100753 | A1 | 4/2015 | Shen et al. |
| 2015/0134931 | A1 | 5/2015 | Mukherjee et al. |
| 2015/0178204 | A1 | 6/2015 | Ray et al. |
| 2015/0186068 | A1 | 7/2015 | Benisty et al. |
| 2015/0186191 | A1 | 7/2015 | Fahim et al. |
| 2015/0205728 | A1 | 7/2015 | Bennett et al. |
| 2016/0140047 | A1 | 5/2016 | Mukherjee et al. |
| 2016/0140060 | A1 | 5/2016 | Mukherjee et al. |
| 2016/0140061 | A1 | 5/2016 | Mukherjee et al. |
| 2016/0188474 | A1 | 6/2016 | Wang et al. |

OTHER PUBLICATIONS

"QuickPath Interconnect: Rules of the Revolution" by Robert J. Safranek and Michelle J. Moravan, Nov. 4, 2009.

Application Note Multiprocessor Systems and the Power PC 603e Microprocessor, Freescale Semiconductor, Inc., 2004.

IBM Technical Disclosure Bulletin NN9405249 Use of the SYNC Instruction to Synchronize Completion of Translation Look Aside Buffer Invalidate in a Multi-Processor System, May 1, 1994.

Li et al., "NUMA-Aware Shared-Memory Collective Communication for MPI," HPDC'13, Jun. 17-21, 2013, New York, NY, 12 pages.

* cited by examiner

MANAGING TRANSLATION INVALIDATION

BACKGROUND

This description relates to managing translation invalidation.

Many processors utilize virtual memory systems, which allow program instructions being executed by a processor to refer to virtual addresses within a 'virtual address space' that is larger than a 'physical address space' that is limited by the size of main memory. Virtual memory involves address translation from a virtual address in a virtual address space into a physical address in a physical address space. The translation is performed using a 'page table' that stores virtual-to-physical address mappings at a granularity of memory pages (or simply 'pages'). Each entry in the page table (or page table entry (PTE)) stores the mapping between virtual and physical address and any other information needed to perform and manage the translation process. The page table is itself stored in main memory. The processor typically also includes a translation lookaside buffer (TLB) for caching frequently used page table entries from a page table. This increases performance since it enables the translation to be performed without necessarily having to access main memory to retrieve a page table entry, except in the case of a miss in the TLB. In some cases, the virtual memory address may be located in a page of a large virtual address space that translates to a page of physical memory that is not currently resident in main memory (i.e., a page fault), in which case that page is then copied into main memory.

For a variety of reasons, a mapping stored in a TLB may become invalid. For example, the page table may store a new mapping for the virtual address, in which case the old mapping cached in the TLB is incorrect. Some processors provide an instruction for invalidating mappings stored in TLB entries to avoid returning incorrect data to a program that uses the mapped virtual address, sometimes referred to as a TLB invalidate (TLBI) instruction (or a TLB-shootdown instruction). When the TLBI instruction for the mapping is issued, any corresponding entries in the TLB (or entries in other data structures storing affected virtual addresses) are invalidated (e.g., by removing them). In processors with multiple processing elements (e.g., cores of a multi-core processor), certain TLBI instructions issued at a local processing element may be broadcast to some or all of the other remote processing elements in the processor.

SUMMARY

In one aspect, in general, a processor includes one or more processing elements. At least a first processing element of the one or more processing elements includes one or more VA-indexed structures indexed by virtual addresses and is configured to handle invalidation messages. The handling includes: in response to determining that a first invalidation message applies to a subset of virtual addresses consisting of fewer than all virtual addresses associated with a first set of one or more translation context values, searching the VA-indexed structures in the first processing element to find any entries that correspond to a virtual address in the subset and invalidating any entries that are found; in response to determining that a second invalidation message applies to all virtual addresses associated with a second set of one or more translation context values and that no entry exists in one or more invalidation-tracking structures corresponding to the second set of one or more translation context values, bypassing searching of any of the VA-indexed structures in the first processing element to find any entries that correspond to a virtual address associated with the second set of one or more translation context values, where the one or more invalidation-tracking structures track invalidation of different sets of one or more translation context values; and in response to determining that a third invalidation message applies to all virtual addresses associated with a third set of one or more translation context values and that at least one entry exists in the one or more invalidation-tracking structures corresponding to the third set of one or more translation context values, storing invalidation information in the one or more invalidation-tracking structures to invalidate the third set of one or more translation context values and delaying searching of any of the VA-indexed structures in the first processing element to find any entries that correspond to a virtual address associated with the third set of one or more translation context values.

In another aspect, in general, a method for managing translation invalidation in a processor includes handling an invalidation message in at least a first processing element, of one or more processing elements of the processor, that includes one or more VA-indexed structures indexed by virtual addresses. The handling includes: in response to determining that a first invalidation message applies to a subset of virtual addresses consisting of fewer than all virtual addresses associated with a first set of one or more translation context values, searching the VA-indexed structures in the first processing element to find any entries that correspond to a virtual address in the subset and invalidating any entries that are found; in response to determining that a second invalidation message applies to all virtual addresses associated with a second set of one or more translation context values and that no entry exists in one or more invalidation-tracking structures corresponding to the second set of one or more translation context values, bypassing searching of any of the VA-indexed structures in the first processing element to find any entries that correspond to a virtual address associated with the second set of one or more translation context values, where the one or more invalidation-tracking structures track invalidation of different sets of one or more translation context values; and in response to determining that a third invalidation message applies to all virtual addresses associated with a third set of one or more translation context values and that at least one entry exists in the one or more invalidation-tracking structures corresponding to the third set of one or more translation context values, storing invalidation information in the one or more invalidation-tracking structures to invalidate the third set of one or more translation context values and delaying searching of any of the VA-indexed structures in the first processing element to find any entries that correspond to a virtual address associated with the third set of one or more translation context values.

Aspects can include one or more of the following features.

The one or more invalidation-tracking structures includes entries that map a plurality of sets of one or more translation context values to corresponding translation context identifiers, where a total number of bits used to represent all possible translation context identifiers is smaller than a total number of bits used to represent all possible sets of one or more translation context values.

The VA-indexed structures include entries that store at least a portion of a virtual addresses and a corresponding translation context identifier associated with that virtual address.

Handling the first invalidation message includes: accessing the one or more invalidation-tracking structures to determine a translation context identifier corresponding to the first set of one or more translation context values, and preserving any invalidation information indicating that the first set of one or more translation context values remain valid after handling the first invalidation message.

The one or more invalidation-tracking structures include a first invalidation-tracking structure that includes entries for a plurality of translation context values representing a first type of translation context information, and a second invalidation-tracking structure that includes entries for a plurality of translation context values representing a second type of translation context information.

The one or more processing elements includes a plurality of processing elements, and the first invalidation message, the second invalidation message, and the third invalidation message are all received by the first processing element and are all sent by a processing element different from the first processing element.

Searching of any of the VA-indexed structures in the first processing element to find any entries that correspond to a virtual address associated with any set of one or more translation context values causes an interruption to a pipeline of the first processing element.

The bypassing causes the second invalidation message to be handled without interrupting the pipeline of the first processing element.

The delaying causes the third invalidation message to be handled without interrupting the pipeline of the first processing element at least until the one or more invalidation-tracking structures are flushed.

The VA-indexed structures include at least one of the following structures: a translation lookaside buffer, a level one data cache, a level one instruction cache, or a page table walker.

Aspects can have one or more of the following advantages.

There are different types of TLBI instructions. An address-based TLBI instruction invalidates mappings for a particular virtual address or a particular subset of virtual addresses within some indicated range of addresses (e.g., virtual addresses on a particular page based on its virtual page number, or some other range of addresses based on a set of high order virtual address bits selected by the processor). A context-based TLBI instruction invalidates mappings for all virtual addresses that are associated with an indicated 'translation context' (sometimes called a 'software context', or simply a 'context'), which are described in more detail below. For some computing system architectures, an address-based TLBI instruction can be converted into a context-based TLBI instruction, under certain circumstances that may be determined by the architecture. In such circumstances, the translations defined by the mappings are 'over-invalidated', which means that the particular address(es) indicated by the TLBI instruction are invalidated along with other addresses in the same translation context. Over-invalidation may have performance consequences, but still preserves correctness because the mappings being removed from the TLB can be recovered from the page table.

Both address-based and context-based TLBI instructions can be either 'local' or 'broadcast'. When a local TLBI instruction is issued at a particular processing element, the local TLBI instruction causes invalidation of any TLB entries associated with an indicated virtual memory address or translation context in the TLB of only that particular 'local' processing element. When a broadcast TLBI instruction is issued at a particular processing element, the broadcast TLBI instruction causes invalidation of any TLB entries associated with an indicated virtual memory address or translation context in the TLBs of that particular 'local' processing element and all of the other 'remote' processing elements in communication with that local processing element (e.g., via a broadcast element), as described in more detail below. Unfortunately, broadcast TLBI instructions received by a remote processing element can cause disruption to its pipeline, particularly if the indicated virtual address or translation context is absent from the TLB of the remote processing element. An invalidation-tracking structure can be used to handle context-based TLBI instructions in a manner that mitigates such disruption, as described in more detail below.

In some implementations, the invalidation-tracking structure is configured not only store context information for use in tracking translation invalidations, but also to compress the context information into a smaller number of bits, called a context identifier (CID). This CID is tracked within separate invalidation-tracking structures maintained by each processing element, and is used in place of a longer set of translation context bits that would normally be stored within certain virtual address-indexed (VA-indexed) structures, as described in more detail below. The invalidation-tracking structure can be used in a manner that avoids the need for other hardware structures that would take significant amount of space on an integrated circuit of the processor, and is able to improve performance by reducing disruption of the pipeline.

Other features and advantages of various embodiments will become apparent from the following description, and from the claims.

DESCRIPTION

Figure 1:
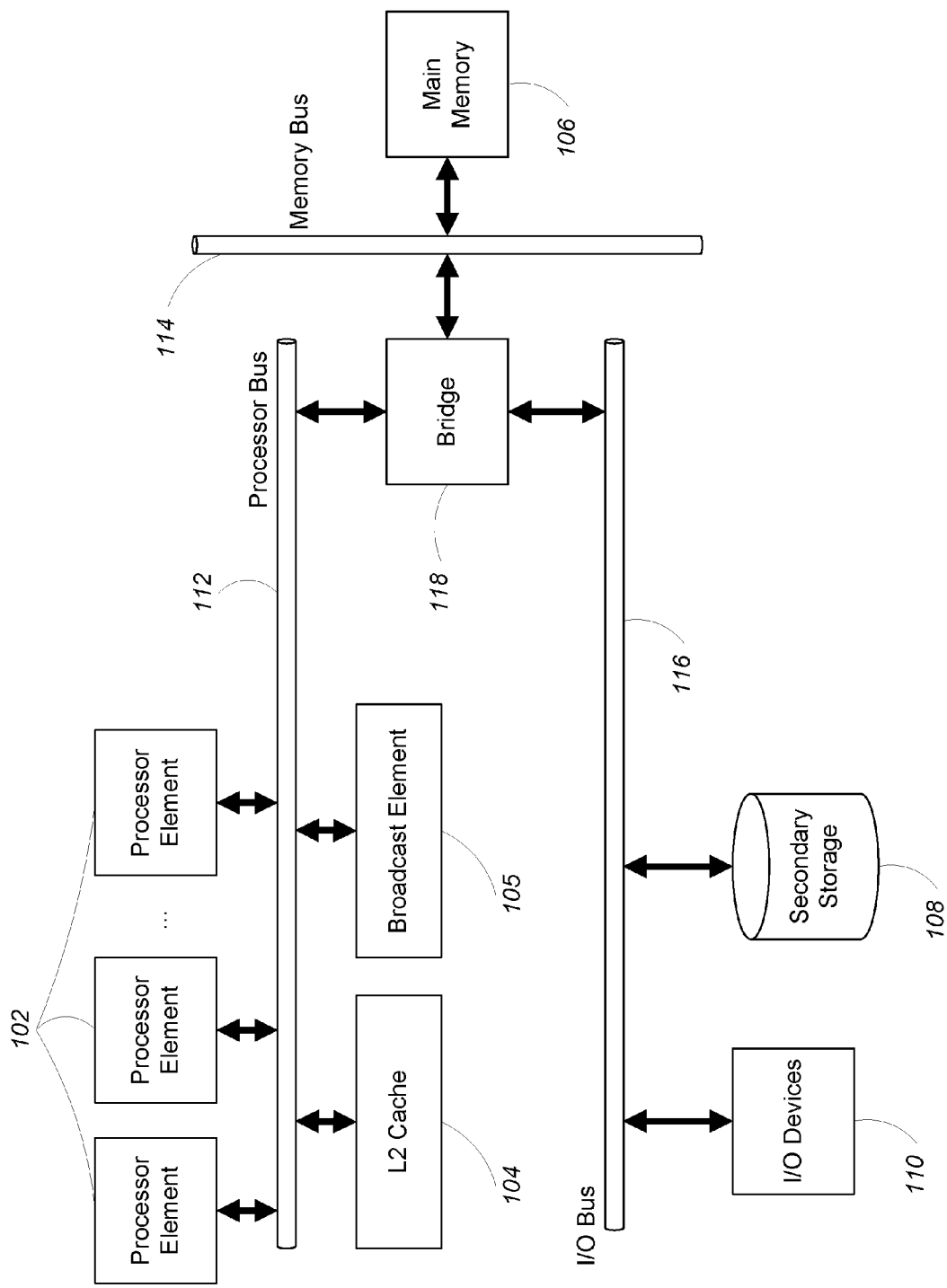
FIG. 1 is a schematic diagram of a computing system.

Referring to FIG. 1, a computing system 100 includes a multi-element processor with a number of processing elements 102, a level 2 (L2) cache 104 (e.g., SRAM), a broadcast element 105, a main memory 106 (e.g., DRAM), a secondary storage device (e.g., a magnetic disk) 108, and one or more input/output (I/O) devices 110 (e.g., a keyboard or a mouse). As part of the virtual memory system, the secondary storage device 108 stores memory pages within different more virtual address spaces that are copied into the main memory 106 in response to a page fault. The processing elements 102, the L2 cache 104, and the broadcast element 105 are connected to a processor bus 112, the main memory 106 is connected to a memory bus 114, and the I/O devices 110 and the secondary storage device 108 are connected to an I/O bus 116. The processor bus 112, the memory bus 114, and the I/O bus 116 are connected to one another via a bridge 118. In this example architecture, the processing elements 102 are individual processor cores that together form a multi-core processor. In some architectures, different subsets of the processing elements 102 may be part of different integrated circuits that are installed into different sockets of a larger system.

Very generally, the broadcast element 105 allows for any one of the processor elements 102 to broadcast commands or instructions to other of the processing elements 102 over the processor bus 112. When a broadcast TLBI instruction is issued at a given, local processing element 102, the broadcast TLBI instruction is processed locally and is also transmitted (with aid of the broadcast element 105) to each of the remote processing elements 102 and handled appropriately, as described in more detail below. In some implementations, each of the one or more remote processing elements sends an acknowledgement back to the originating processing element via the broadcast element, indicating that the TLBI instruction has been appropriately handled at the remote processing element. In some situations, there is a need to synchronize the multiple processing elements by suspending processing at the local processing element until all of the remote TLBI instructions that it has broadcast have been handled and acknowledged at all of the remote processing elements.

Figure 2:
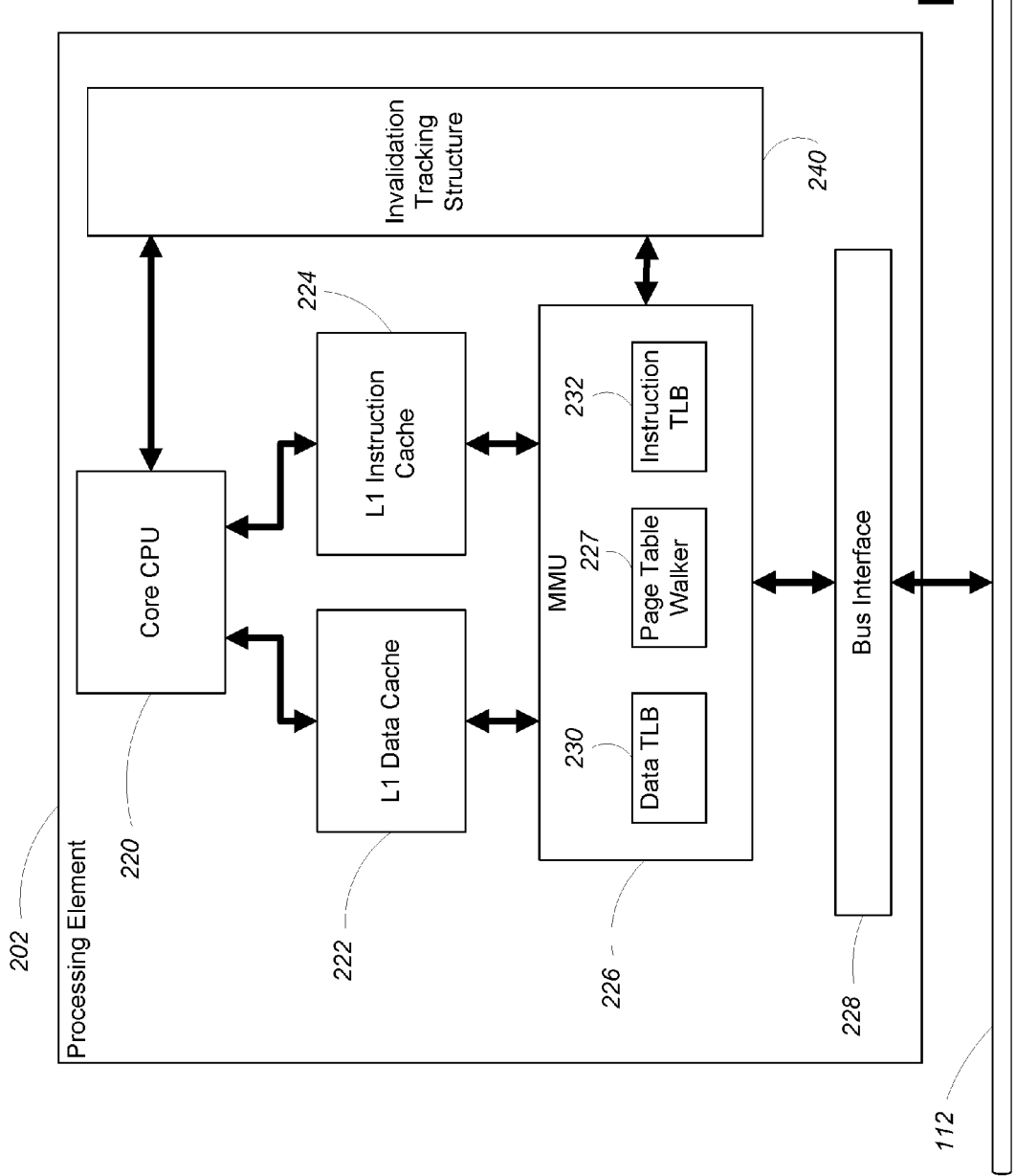
FIG. 2 is a schematic diagram of a processing element.

Referring to FIG. 2, one example of a processing element 202 of the processing elements 102 of FIG. 1 is shown connected to the processor bus 112. The processing element 202 includes a core CPU 220 having an internal pipeline through which instructions are executed in a number of pipeline stages. The processing element 202 also includes a level 1 (L1) data cache 222, an L1 instruction cache 224, a memory management unit (MMU) 226, and a bus interface 228. The MMU 226 includes a page table walker 227, a data translation lookaside buffer (TLB) 230, and an instruction translation lookaside buffer (TLB) 232. Note that, in some examples, distinction between the data TLB 230 and the instruction TLB 232 is logical and the two TLBs 230, 232 share the same structure or are combined into a single TLB or are divided into one or more macro TLBs and micro TLBs. Very generally, the core CPU 220 executes instructions, which, in some cases, require access to memory addresses in the memory hierarchy of the computing system 100. The instructions executed by the processing element 202 of FIG. 2 use virtual memory addresses, and the caches and translation structures within the MMU 226 are virtual address-indexed (VA-indexed) (also called 'virtually indexed') structures that are indexed by virtual addresses. So, all of these VA-indexed structures have entries that store at least a portion of a virtual address used for that indexing, which are subject to invalidation via a TLBI instruction.

An invalidation-tracking structure (ITS) 240 enables the processing element 202 to handle TLBI instructions (or any invalidation message for invalidating virtual-to-physical address mappings stored in a given processing element) in a manner that delays, or even completely avoids, the time-consuming step of searching the VA-indexed structures to find and invalidate any relevant entries that may be found. Even if no relevant entries are actually stored, such searching would still interrupt the pipeline and take valuable time away from useful processing. In this example, the core CPU 220 and the MMU 226 each have direct access to the ITS 240, but any of a variety of other circuitry or communication architectures could be used to provide direct or indirect access to the ITS 240.

Before describing the details of the use of the ITS 240 for handling context-based TLBI instructions, it is useful to review the content and use of a translation context. When establishing a translation from a particular virtual address to a particular physical address, various types of context information is used to distinguish otherwise identical virtual addresses from each other. This enables multiple independent virtual address spaces to exist for different processes or different virtual machines or any of a variety of other differentiating characteristics that support different virtual address spaces. As used herein, a 'translation context' includes that portion of the context information that is used for differentiating between virtual addresses that are in use within different virtual address to physical address translations (or VA to intermediate physical address (IPA) translations, or IPA to physical address (PA) translations).

For example, an operating system may use an address space identifier (ASID) to identify a memory space (a virtual address space) associated with a running process. A hypervisor may use a virtual machine identifier (VMID) to identify a memory space (intermediate physical address space) associated with a guest operating system of a virtual machine. Certain parameters may be associated with different classes of processes or software environments that are available in an architecture, such as a security state with values of secure (S) or non-secure (NS), or an exception level (also called a 'privilege level' or 'priority level') with values of EL0-EL4. Such identifiers (or some predefined portion of them), as well as other identifiers or parameters, are typically used as translation context values included within a translation context.

The total number of bits used to designate a translation context may be relatively large. In ARM architectures, for example, the security state may be a one-bit parameter, the exception level (EL) may be a two-bit parameter, the ASID may be a 16-bit identifier, and the VMID may be a 16-bit identifier, for a total of 35 bits of context information. Some techniques can be used to compress such context information to provide a translation context identifier (TCID) with fewer bits than are contained in the full set of context information. These reduced-size TCIDs can then be stored in the VA-indexed structures within the processing elements 102 resulting in more efficient use of chip area within an integrated circuit. For example, a TCID can be stored as part of a tag within a content-addressable memory (CAM) of one of the VA-indexed structures, or as part of a tag that distinguishes different regions of a random-access memory (RAM) of one of the VA-indexed structures. A context mapping table can be stored within each processing element that maps TCIDs to the corresponding full set of context information only for the limited set of context information actually in use, which can be limited to a relatively small number of possible TCIDs (depending on how many bits are allocated to a TCID). Instead of a maximum of billions of simultaneous contexts (where 35 bits yields $2^{35}$, or 32 billion different contexts) it may be sufficient for a modern microprocessor to be able to run thousands, or hundreds, or only tens of simultaneous contexts (e.g., 6 bits yields $2^6$, or 64 different contexts). Thus, this context mapping table indicates which translation context values are included within any given compressed translation context identified by a TCID.

As part of such a context mapping table, or as a completely separate data structure, the processing element 202 includes an ITS 204 that is used to handle context-based TLBI instructions. In some implementations, address-based TLBI instructions are not handled by the ITS 204, and are instead handled by directly (i.e., without delay) processed to invalidate the virtual address (or addresses) identified by the address-based TLBI instruction within all of the VA-indexed structures. The context mapping table, which may be part of the ITS 204 is still used for the address-based TLBI instructions, but only to determine the TCID corresponding to the address(es) to be searched for when removing invalid entries from the VA-indexed structures. The determined TCID remains valid within the ITS 204 because other virtual addresses within that translation context would still need the TCID to be present and valid within the ITS 204, unless the address-based TLBI instruction is converted into a context-based TLBI instruction if over-invalidation is being applied. Another situation in which over-invalidation may be applied is with multi-stage translation (e.g., VA to IPA to PA) to ensure correctness since the translation context may only apply to the first stage (VA to IPA) but not the second stage (IPA to PA). The second stage may not have a translation context of its own since it is only meaningful in combination with the first stage. But, there still needs to be a way to invalidate the second stage translation, even without a ITS for the second stage. Alternatively, there could be multiple ITSs—one for the first stage and one for the second stage.

In some implementations each processing element 102 handles all context-based TLBI instructions in the same manner, using the ITS 204. In other implementations, the local processing element 102 at which the context-based TLBI instruction is originally issued handles it directly, in a similar manner as address-based TLBI instructions, and only remote processing elements 102 handle a broadcast context-based TLBI using the ITS 204 to delay or avoid searching the VI-indexed structures, using a 'truncated invalidation procedure,' as described herein.

Figure 3:
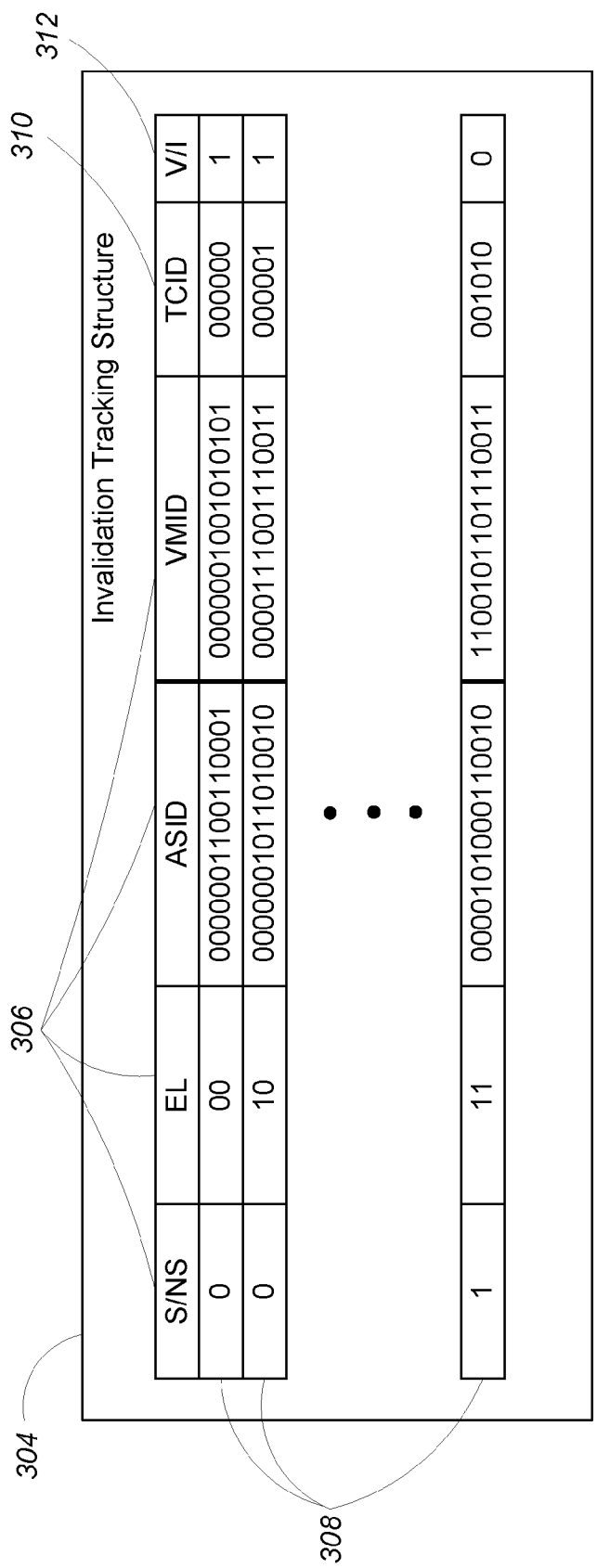
FIG. 3 is a table illustrating content of an example invalidation-tracking structure.

FIG. 3 shows an example of an ITS 304. In this example the data structure storing the ITS 304 is in the form of a table, but other data structures could be used, such as a linked list, or a tree, associative array, or other appropriate data structure within a dedicated hardware storage element in a processing element 102. The ITS 304 stores sets of translation context values in lookup fields 306 that can be searched for particular bit sequences in one of the rows 308. The rows 308 are populated by the processing element when a new translation context is added by the system 100. The ITS 304 includes a TCID field 310 that explicitly provides a TCID corresponding to set of translation context values indicated by the stored bit sequence in the lookup fields 306. So, in this example, a combined 35 bits of the translation context values is mapped to a shorter string of 6 bits of the TCID. The ITS 304 also includes a status field 312 for storing invalidation information (e.g., a single bit) indicating the entry is valid (V) or invalid (I) (e.g., V=1, I=0). In other implementations, instead of providing a field with an explicit value of the TCID, the TCID can be implicitly assigned based on a row number in which the set of translation context values are stored, with a total number of rows being determined by the number of bits in the TCID. Or, there can be multiple tables (or other data structures) storing different sets of translation context values. For example, one table could store the VMID, another table could store the ASID, EL, and security state (S/NS) values. Corresponding rows in each table would be accessed (and invalidated) together, and sub-strings of the mapped TCID value from the two tables would be concatenated together to provide the full TCID value.

Figure 4:
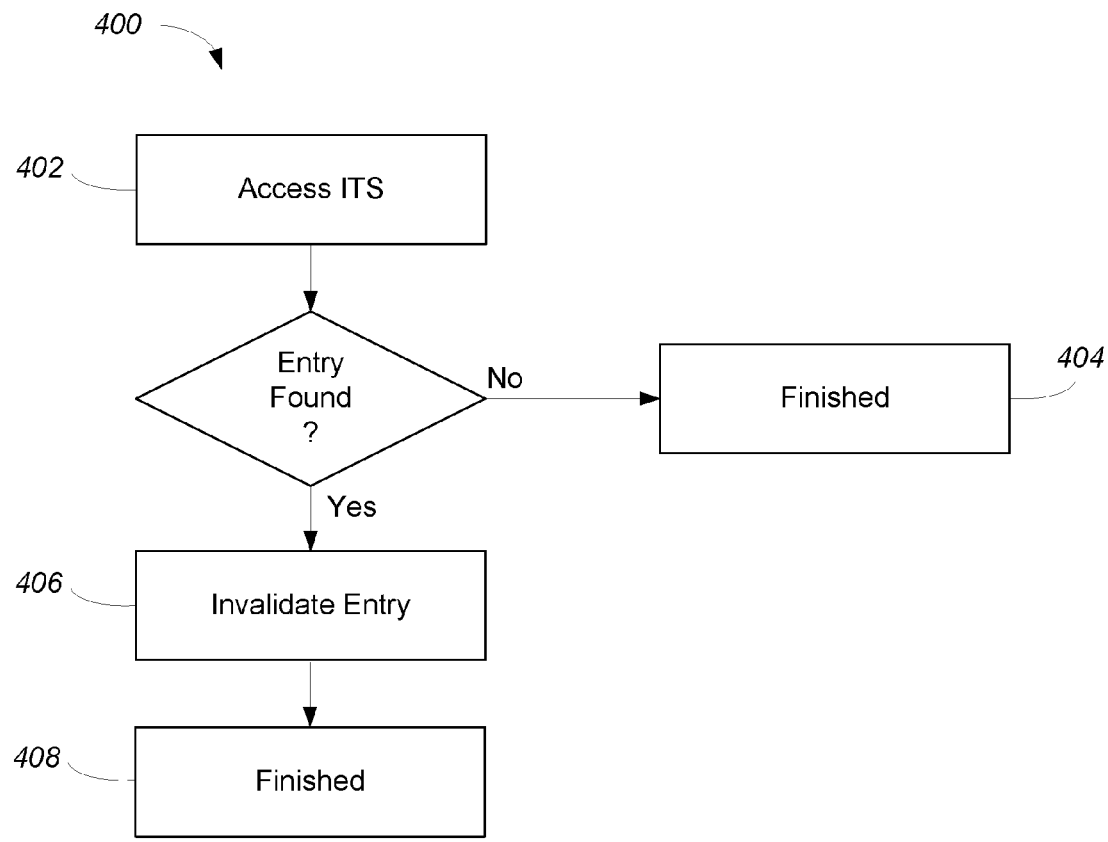
FIG. 4 is a flowchart of a truncated invalidation procedure for handling translation invalidation.

FIG. 4 shows an example of a flowchart for a truncated invalidation procedure 400 for handing an incoming context-based TLBI instruction (e.g., received by a remote processing element). Before the procedure 400 there is a procedure that distinguishes between address-based TLBI instructions and context-based TLBI instructions. The processing element accesses (402) its ITS when the context-based TLBI instruction is received to search for a particular set of translation context values provided within the context-based TLBI instruction. In some cases, the translation context values included within the context-based TLBI instruction may just be a subset of the translation context values, with the other translation context values being unnecessary for uniquely identifying a particular row to be invalidated, or being deliberately unspecified for identifying multiple rows to be invalidated. The processing element includes hardware circuitry for performing this access, and therefore does not need to rely on software (i.e., instructions executed by the core CPU, which would disrupt its pipeline). If no entry is found in the ITS corresponding to the translation context values, then the processing element has finished (404) handling the TLBI instruction, which may involve sending an acknowledgement back that the TLBI instruction has been handled. In this case, the processing element is able to bypass searching of any of the VA-indexed structures in the processing element to find any entries that correspond to a virtual address associated with the translation context values. If an entry is found in the ITS corresponding to the translation context values, the processing element invalidates (406) the entry by storing invalidation information in the ITS, and then the processing element is finished (408) handling the TLBI instruction, which may involve sending an acknowledgement back that the TLBI instruction has been handled. In this case, the processing element is able to delay searching of any of the VA-indexed structures in the processing element to find any entries that correspond to a virtual address associated with the translation context values. In some cases, while the search of the VA-indexed structures is bypassed or delayed, there may be other locations (e.g., registers) that contain information that is changed or removed when handling a context-based TLBI instruction, but still without interrupting the pipeline of the core CPU.

The delay before the VA-indexed structures are searched to invalidate any entries whose translation context is invalid may encompass a relatively long amount of processing time. During that time, it is sufficient to invalidate a translation context for a set of virtual addresses that may have active mappings stored in the VA-indexed structures, because any access of those VA-indexed structures will first involve accessing the ITS to retrieve the TCID for those active mappings, and (even if the TCIDs are stored in a separate table) to check for the validity of the virtual addresses associated with that translation context. But, eventually, when the processing element attempts to add a new translation context, the ITS will be full with no available rows left to add a new translation context. When this happens, the ITS is flushed (i.e., emptied or indicated in some way that all the rows are available for storing new translation contexts), and all of the VA-indexed structures are searched at that time to find any entries that correspond to a virtual address associated with the translation context values in the ITS and invalidating those entries. This search operation is expensive in computation time, but since it is relatively rare, the impact on performance is limited.

Other embodiments may fall within the scope of the following claims, which do not necessarily include all of the features or advantages of the embodiments described above.

What is claimed is:

1. A processor, comprising:
   one or more processing elements, including at least a first processing element that includes one or more VA-indexed structures indexed by virtual addresses and that is configured to handle invalidation messages, the handling including:
   in response to determining that a first invalidation message applies to a subset of virtual addresses consisting of fewer than all virtual addresses associated with a first set of one or more translation context values, searching the VA-indexed structures in the first processing element to find any entries that correspond to a virtual address in the subset and invalidating any entries that are found;

in response to determining that a second invalidation message applies to all virtual addresses associated with a second set of one or more translation context values and that no entry exists in one or more invalidation-tracking structures corresponding to the second set of one or more translation context values, bypassing searching of any of the VA-indexed structures in the first processing element to find any entries that correspond to a virtual address associated with the second set of one or more translation context values, where the one or more invalidation-tracking structures track invalidation of different sets of one or more translation context values; and in response to determining that a third invalidation message applies to all virtual addresses associated with a third set of one or more translation context values and that at least one entry exists in the one or more invalidation-tracking structures corresponding to the third set of one or more translation context values, storing invalidation information in the one or more invalidation-tracking structures to invalidate the third set of one or more translation context values and delaying searching of any of the VA-indexed structures in the first processing element to find any entries that correspond to a virtual address associated with the third set of one or more translation context values.

2. The processor of claim 1, wherein the one or more invalidation-tracking structures includes entries that map a plurality of sets of one or more translation context values to corresponding translation context identifiers, where a total number of bits used to represent all possible translation context identifiers is smaller than a total number of bits used to represent all possible sets of one or more translation context values.

3. The processor of claim 2, wherein the VA-indexed structures include entries that store at least a portion of a virtual addresses and a corresponding translation context identifier associated with that virtual address.

4. The processor of claim 2, wherein handling the first invalidation message includes: accessing the one or more invalidation-tracking structures to determine a translation context identifier corresponding to the first set of one or more translation context values, and preserving any invalidation information indicating that the first set of one or more translation context values remain valid after handling the first invalidation message.

5. The processor of claim 1, wherein the one or more invalidation-tracking structures include a first invalidation-tracking structure that includes entries for a plurality of translation context values representing a first type of translation context information, and a second invalidation-tracking structure that includes entries for a plurality of translation context values representing a second type of translation context information.

6. The processor of claim 1, wherein the one or more processing elements includes a plurality of processing elements, and the first invalidation message, the second invalidation message, and the third invalidation message are all received by the first processing element and are all sent by a processing element different from the first processing element.

7. The processor of claim 1, wherein searching of any of the VA-indexed structures in the first processing element to find any entries that correspond to a virtual address associated with any set of one or more translation context values causes an interruption to a pipeline of the first processing element.

8. The processor of claim 7, wherein the bypassing causes the second invalidation message to be handled without interrupting the pipeline of the first processing element.

9. The processor of claim 7, wherein the delaying causes the third invalidation message to be handled without interrupting the pipeline of the first processing element at least until the one or more invalidation-tracking structures are flushed.

10. The processor of claim 1, wherein the VA-indexed structures include at least one of the following structures: a translation lookaside buffer, a level one data cache, a level one instruction cache, or a page table walker.

11. A method for managing translation invalidation in a processor, the method comprising:

handling an invalidation message in at least a first processing element, of one or more processing elements of the processor, that includes one or more VA-indexed structures indexed by virtual addresses, the handling including:

in response to determining that a first invalidation message applies to a subset of virtual addresses consisting of fewer than all virtual addresses associated with a first set of one or more translation context values, searching the VA-indexed structures in the first processing element to find any entries that correspond to a virtual address in the subset and invalidating any entries that are found;

in response to determining that a second invalidation message applies to all virtual addresses associated with a second set of one or more translation context values and that no entry exists in one or more invalidation-tracking structures corresponding to the second set of one or more translation context values, bypassing searching of any of the VA-indexed structures in the first processing element to find any entries that correspond to a virtual address associated with the second set of one or more translation context values, where the one or more invalidation-tracking structures track invalidation of different sets of one or more translation context values; and in response to determining that a third invalidation message applies to all virtual addresses associated with a third set of one or more translation context values and that at least one entry exists in the one or more invalidation-tracking structures corresponding to the third set of one or more translation context values, storing invalidation information in the one or more invalidation-tracking structures to invalidate the third set of one or more translation context values and delaying searching of any of the VA-indexed structures in the first processing element to find any entries that correspond to a virtual address associated with the third set of one or more translation context values.

12. The method of claim 11, wherein the one or more invalidation-tracking structures includes entries that map a plurality of sets of one or more translation context values to corresponding translation context identifiers, where a total number of bits used to represent all possible translation context identifiers is smaller than a total number of bits used to represent all possible sets of one or more translation context values.

13. The method of claim 12, wherein the VA-indexed structures include entries that store at least a portion of a virtual addresses and a corresponding translation context identifier associated with that virtual address.

14. The method of claim 12, wherein handling the first invalidation message includes: accessing the one or more invalidation-tracking structures to determine a translation context identifier corresponding to the first set of one or more translation context values, and preserving any invalidation information indicating that the first set of one or more translation context values remain valid after handling the first invalidation message.

15. The method of claim 11, wherein the one or more invalidation-tracking structures include a first invalidation-tracking structure that includes entries for a plurality of translation context values representing a first type of translation context information, and a second invalidation-tracking structure that includes entries for a plurality of translation context values representing a second type of translation context information.

16. The method of claim 11, wherein the one or more processing elements includes a plurality of processing elements, and the first invalidation message, the second invalidation message, and the third invalidation message are all received by the first processing element and are all sent by a processing element different from the first processing element.

17. The method of claim 11, wherein searching of any of the VA-indexed structures in the first processing element to find any entries that correspond to a virtual address associated with any set of one or more translation context values causes an interruption to a pipeline of the first processing element.

18. The method of claim 17, wherein the bypassing causes the second invalidation message to be handled without interrupting the pipeline of the first processing element.

19. The method of claim 17, wherein the delaying causes the third invalidation message to be handled without interrupting the pipeline of the first processing element at least until the one or more invalidation-tracking structures are flushed.

20. The method of claim 11, wherein the VA-indexed structures include at least one of the following structures: a translation lookaside buffer, a level one data cache, a level one instruction cache, or a page table walker.

\* \* \* \* \*